United States Patent
Ching et al.

(10) Patent No.: US 11,477,856 B2
(45) Date of Patent: Oct. 18, 2022

(54) ABRADED BUS BAR AREA OF CNT RESISTIVE ELEMENT

(71) Applicant: Goodrich Corporation, Charlotte, NC (US)

(72) Inventors: Nathaniel Ching, Hartville, OH (US); Casey Slane, Tallmadge, OH (US); Jin Hu, Hudson, OH (US)

(73) Assignee: Goodrich Corporation, Charlotte, NC (US)

( * ) Notice: Subject to any disclaimer, the term of this patent is extended or adjusted under 35 U.S.C. 154(b) by 445 days.

(21) Appl. No.: 16/748,325

(22) Filed: Jan. 21, 2020

(65) Prior Publication Data
US 2021/0227640 A1 Jul. 22, 2021

(51) Int. Cl.
*H05B 3/14* (2006.01)
*C01B 32/168* (2017.01)
(Continued)

(52) U.S. Cl.
CPC ........... *H05B 3/145* (2013.01); *C01B 32/168* (2017.08); *C01B 32/194* (2017.08); *C01B 32/21* (2017.08);
(Continued)

(58) Field of Classification Search
CPC .............. H05B 3/145; H05B 2203/017; H05B 2214/02; H05B 2214/04; H05B 3/24; C01B 32/168; C01B 32/194; C01B 32/21; C01B 32/15; C01B 32/05; C01B 32/158; C01B 32/159; C01B 32/16; C01B 32/162; C01B 32/164; C01B 32/166; C01B 32/17; C01B 32/172; C01B 32/174; C01B 32/176; C01B 32/178; C01B 2202/00; C01B 2202/02; C01B 2202/04; C01B 2202/06;
(Continued)

(56) References Cited

U.S. PATENT DOCUMENTS 8,988,756 B2   3/2015   Agrawal et al.
9,193,466 B2   11/2015  Calder et al.
(Continued)

FOREIGN PATENT DOCUMENTS

EP   2667685 A1   11/2013
EP   3297393 A1   3/2018
EP   3339178 A1   6/2018

OTHER PUBLICATIONS

Rawal, et al., Development of carbon nanotube-based composite for spacecraft components, 2013 6th International Conference on Recent Advances in Space Technologies (RAST) (Year: 2013).*
(Continued)

*Primary Examiner* — Daniel C. McCracken
(74) *Attorney, Agent, or Firm* — Kinney & Lange, P.A.

(57) ABSTRACT

A carbon allotrope element includes a carbon allotrope layer formed from a carbon allotrope material impregnated with a dielectric resin and having a first surface. The carbon allotrope element further includes a first bus bar in communication with the first surface, and a second bus bar in communication with the first surface and non-adjacent to the first bus bar. The first surface includes a layer of the dielectric resin and a plurality of abraded regions, and each of the first and second bus bars is in communication with one of the plurality of abraded regions of the first surface.

19 Claims, 2 Drawing Sheets

(51) Int. Cl.
  *C01B 32/194* (2017.01)
  *C01B 32/21* (2017.01)
(52) U.S. Cl.
  CPC .... *C01P 2004/13* (2013.01); *H05B 2203/017* (2013.01); *H05B 2214/02* (2013.01); *H05B 2214/04* (2013.01)
(58) Field of Classification Search
  CPC ............ C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; C01P 2004/13; C08J 7/04; C08K 3/04; H01B 1/04; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133
  See application file for complete search history.

(56) References Cited

U.S. PATENT DOCUMENTS

| | | |
|---|---|---|
| 10,438,880 B2 | 10/2019 | Kabir et al. |
| 2008/0170982 A1* | 7/2008 | Zhang .................. H01L 51/444 423/447.3 |
| 2009/0095714 A1 | 4/2009 | Mao et al. |
| 2015/0327334 A1 | 11/2015 | Choi et al. |
| 2018/0176993 A1* | 6/2018 | Zhao ...................... H05B 3/145 |
| 2019/0124724 A1 | 4/2019 | Slane et al. |

OTHER PUBLICATIONS

Extended European Search Report for EP Application No. 21152782.5, dated Jun. 18, 2021, 7 pages.

* cited by examiner

US 11,477,856 B2

ABRADED BUS BAR AREA OF CNT RESISTIVE ELEMENT

BACKGROUND

The disclosed subject matter relates to resistive elements, and more particularly, to resistive elements formed from a carbon allotrope material.

Carbon nanotubes (CNTs) are allotropes of carbon having a generally cylindrical nanostructure, and have a variety of uses in nanotechnology, electronics, optics and other materials sciences. CNTs are both thermally and electrically conductive. Due to these properties, CNTs can be used as resistive elements (e.g., as heaters or sensors) on aircraft and other vehicles. Other carbon allotropes, such as graphene or graphene nanoribbons (GNRs), can also be used for these purposes. Graphene has a two-dimensional honeycomb lattice structure, and is much stronger than steel, but is still electrically and thermally conductive. GNRs are strips of graphene with ultra-thin widths. Carbon allotrope elements are uniquely beneficial for de-icing because of their high efficiency, light weight and ability to be molded into specific shapes, and durability.

Carbon allotropes can be arranged in sheets and impregnated with a resin material to form a resin matrix. The impregnation process can create a thin encapsulating layer of resin surrounding the sheet. Generally, carbon allotrope elements are mechanically attached to metallic bus bars, which in turn are wired to electronics that can provide energy or record data. Impregnating resin at the site of the bus bar attachment can diminish the electrical properties of the carbon allotrope element because of the dielectric properties of the resin.

SUMMARY

A carbon allotrope element includes a carbon allotrope layer formed from a carbon allotrope material impregnated with a dielectric resin and having a first surface. The carbon allotrope element further includes a first bus bar in communication with the first surface, and a second bus bar in communication with the first surface and non-adjacent to the first bus bar. The first surface includes a layer of the dielectric resin and a plurality of abraded regions, and each of the first and second bus bars is in communication with one of the plurality of abraded regions of the first surface.

A method of forming a carbon allotrope element includes removing material from a first surface of a carbon allotrope layer to form an abraded region and adhering a bus bar to the abraded region. The material removed from the first surface can include a dielectric resin layer.

Figure 1:
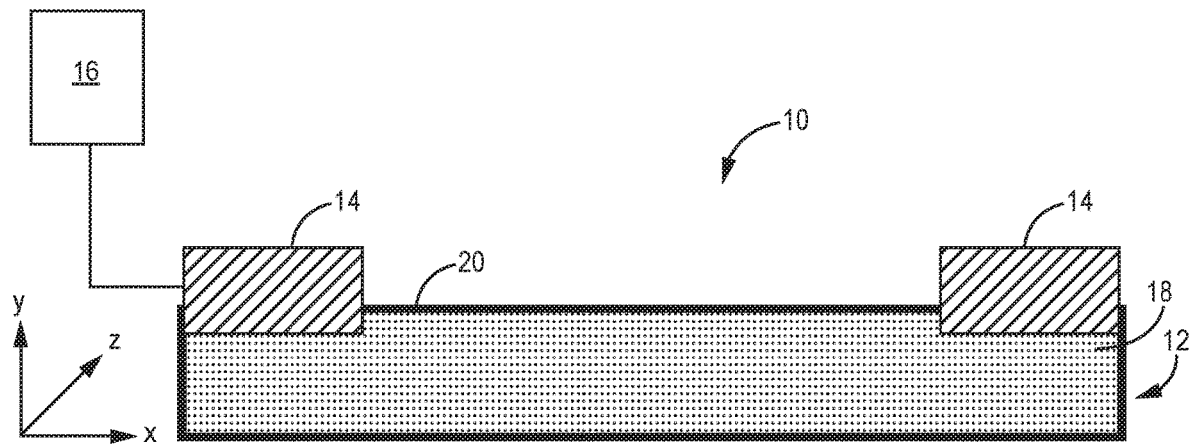
FIG. 1 is a cross-sectional view of a carbon allotrope element including a carbon allotrope layer with attached bus bars.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

A resistive carbon allotrope element with abraded regions for bus bar attachment is disclosed herein. The element includes a layer of carbon allotrope material that is selectively abraded in the regions desired for bus bar attachment. The carbon allotrope layer can be abraded such that only encapsulating resin material is removed, or such that both encapsulating resin material and some carbon allotrope material are removed. The abraded region can further be relatively level, or angled, depending on the embodiment. The removal of some or all of the encapsulating resin allows for better electrical communication between the carbon allotrope layer and the bus bar(s).

FIG. 1 is a cross-sectional view of a carbon allotrope element 10. Carbon allotrope element 10 is a resistive element that can include carbon allotrope layer 12 and bus bars 14 in communication with carbon allotrope layer 12. Bus bars 14 can be arranged to electrically connect power source 16 (shown schematically) with carbon allotrope layer 12. Carbon allotrope element 10 can be, for example, a resistive heating element (e.g., for anti-icing applications), or a sensing element (e.g., a strain gauge). In an embodiment in which carbon allotrope element 10 is a sensing element, power source 16 can alternatively represent an external component wired to element 10 (e.g., power supply, sensor electronics, processor, etc.). Although shown in cross-section in FIG. 1, with various components (e.g., layer 12, bus bars 14) of carbon allotrope element 10 extending along the x and y axes, it should be understood that carbon allotrope element 10 can include dimensions along the z axis.

Carbon allotrope layer 12 can be a generally planar structure formed from one or more sheets 18 of a conductive carbon allotrope material. Suitable materials include carbon nanotubes (CNTs), nano-carbon fibers, graphene nanoribbons (GNRs), and graphite, to name a few non-limiting examples. As shown in FIG. 1, carbon allotrope layer 12 is formed from a single sheet 18 of carbon allotrope material. Layer 12/sheet 18 can be impregnated with a dielectric resin, such as an epoxy resin, phenolic resin, cyanate ester resin, benzoxazine resin, bismaleimide resin, polyimide resin, polyester resin, and/or polyurethane resin to form a matrix. During the impregnation process, the resin can form dielectric layer 20 encapsulating some or all of carbon allotrope layer 12/sheet 18.

Bus bars 14 can have a quadrilateral shape (e.g., rectangle, square, etc.) and can be formed from a conductive material such as a metal or metal alloy (e.g., copper or brass), or a conductive ink (e.g., silver-loaded ink). Other suitably conductive materials are contemplated herein. The embodiment of FIG. 1 shows two bus bars 14 with generally uniform cross-sectional dimensions, however, alternative embodiments can include more than two bus bars 14 and/or bus bars 14 having different shapes and dimensions. Dielectric layer 20 can be present at the desired locations for attachment of bus bars 14 along carbon allotrope layer 12. Due to the dielectric properties of dielectric layer 20, it may be desirable to reduce the intervening amount of dielectric layer 20 to increase the electrical connectivity between bus bars 14 and the carbon allotrope material of layer 12.

Figure 1A:
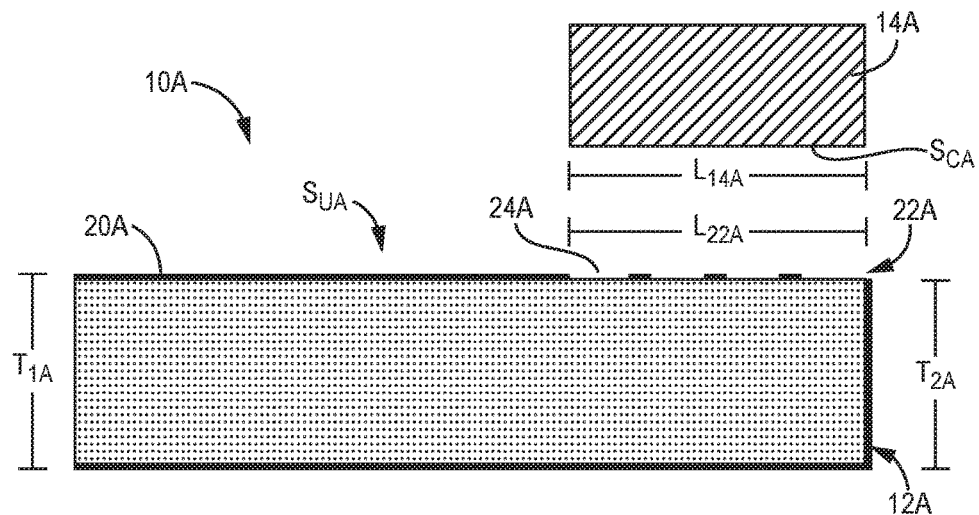
FIG. 1A is an enlarged cross-sectional view showing an abraded region of the carbon allotrope layer according to an embodiment of the carbon allotrope element.

FIG. 1A is a cross-sectional view of carbon allotrope element 10A showing a portion of carbon allotrope layer 12A prior to the attachment of bus bar 14A. Carbon allotrope element 10A is substantially similar to carbon allotrope element 10, as described above. In the embodiment shown, carbon allotrope layer 12A includes abraded region 22A formed in upper surface $S_{UA}$ of carbon allotrope layer 12A. Abraded region 22A includes alternating resin-free sections 24A (i.e., sections free of dielectric layer 20A). Although shown with some residual dielectric layer 20A in abraded region 22A, dielectric layer 20A can be completely removed from abraded region 22A, such that abraded region 22A represents a single resin-free section 24A. Alternative embodiments can include more or fewer resin-free sections 24A and/or differently patterned (e.g., hatched, zig-zag, etc.) sections depending on the embodiment, depending on the desired degree of connectivity between bus bar 14A and the carbon allotrope material of layer 12A.

Carbon allotrope layer 12A has a first thickness $T_{1A}$ that includes dielectric layer 20A. Depending on the application, first thickness $T_{1A}$ can generally range from 0.0001 in (0.00254 mm) to 0.005 in (0.127 mm), and further from 0.001 in (0.0254 mm) to 0.003 in (0.0762 mm) or 0.0015 in (0.0381 mm) to 0.0025 in (0.0635 mm) in exemplary embodiments. Due to the presence of abraded region 22A, carbon allotrope layer 12A also has a second thickness $T_{2A}$ representing carbon allotrope layer 12A at the location of a resin-free section 24A. Second thickness $T_{2A}$ is less than first thickness $T_{1A}$, and can, more specifically, range from 50% to 95% of the first thickness $T_{1A}$. In an exemplary embodiment, second thickness $T_{2A}$ can range from 65% to 85% of the first thickness $T_{1A}$.

Abraded region 22A has a length $L_{22A}$, which, as shown in FIG. 1A, extends in the x direction (labeled in FIG. 1) from a leftmost resin-free section 24A to an edge of carbon allotrope layer 12A. Abraded region 22A can further have a width extending perpendicularly to its length $L_{22A}$ in the z direction (labeled in FIG. 1), although not shown in the cross-sectional view of FIG. 1A. Bus bar 14A also has a length $L_{14A}$ (shown at contact surface $S_{CA}$) and a width (not shown) extending in the x and z directions, respectively. In this regard, each of abraded region 22A and bus bar 14A can have an area as a function of the length (x) and width (z) dimensions. As shown in FIG. 1A, lengths $L_{22A}$ and $L_{14A}$ are substantially equivalent, and the widths of each of abraded region 22A and bus bar 14A can also be substantially equivalent. Accordingly, the areas of each of abraded region 22A and bus bar 14A can substantially equivalent. Thus, contact surface $S_{CA}$ can be substantially coextensive with abraded region 22A when bus bar 14A is attached to carbon allotrope layer 12A at abraded region 22A.

Figure 1B:
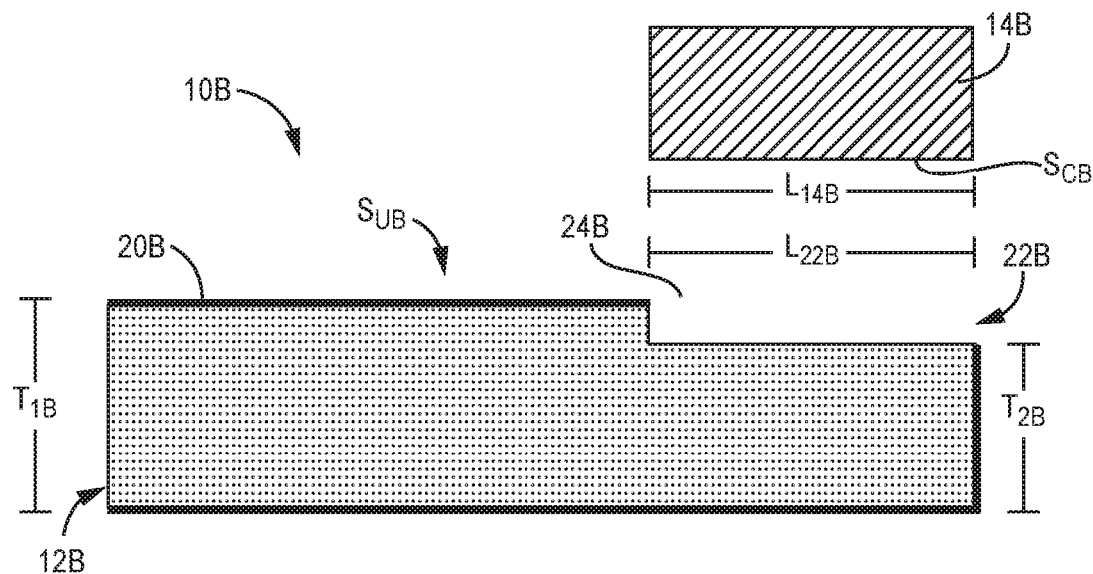
FIG. 1B is an enlarged cross-sectional view showing an abraded region of the carbon allotrope layer according to an alternative embodiment of the carbon allotrope element.

FIG. 1B is a cross-sectional view of carbon allotrope element 10B showing a portion of carbon allotrope layer 12B prior to the attachment of bus bar 14B. Carbon allotrope element 10B is similar to carbon allotrope elements 10 and 10A, as described above, except for abraded region 22B formed in upper surface $S_{UB}$ of carbon allotrope layer 12B. In the embodiment shown in FIG. 1B, abraded region 22B differs from abraded region 22A in that it includes a single resin-free region 24B representing a removal of dielectric layer 20B. In addition to resin-free region 24B, abraded region 22B also includes a removed amount of carbon allotrope material from carbon allotrope layer 12B.

Carbon allotrope layer 12B has a first thickness $T_{1B}$ that is substantially similar to first thickness $T_{1A}$ of carbon allotrope layer 12A. Carbon allotrope layer 12B also has a second thickness $T_{2B}$ at abraded region 22B. Like second thickness $T_{2A}$ of carbon allotrope layer 12A, second thickness $T_{2B}$ can be a percentage of first thickness $T_{1B}$ (i.e., from 50% to 95%, or in an exemplary embodiment, from 65% to 85%) of the first thickness $T_{1A}$. However, because abraded region 22B includes the removal of carbon allotrope material in addition to dielectric layer 20B, second thickness $T_{2A}$ can be comparatively less than second thickness $T_{2A}$ of the embodiment of FIG. 1A.

Like the embodiment of FIG. 1A, abraded region 22B has a length $L_{22B}$ extending in the x direction, and a width (not shown) extending in the z direction. Similarly, bus bar 14B has a length $L_{14B}$ extending in the x direction and a width (not shown) extending in the z direction. However, in the embodiment of FIG. 1B, length $L_{14B}$ is slightly greater than $L_{22B}$. As such, when attached to carbon allotrope layer 12B, contact surface $S_{CB}$ of bus bar 14B can extend beyond abraded region 22B in at least the x direction. Such an arrangement can ensure complete coverage of abraded region 22B by contact surface $S_{CB}$ of bus bar 14B. This can be desirable if the abraded region includes the combined removal of the dielectric layer and carbon allotrope material. Exposed carbon allotrope material can have a higher resistance than other regions of the carbon allotrope element and thus, should be covered by the bus bar to manage positional and dimensional tolerances. Ensuring complete coverage of abraded region 22B can additionally and/or alternatively be accomplished by providing a bus bar 14B having a greater width than the width of abraded region 22B.

Figure 1C:
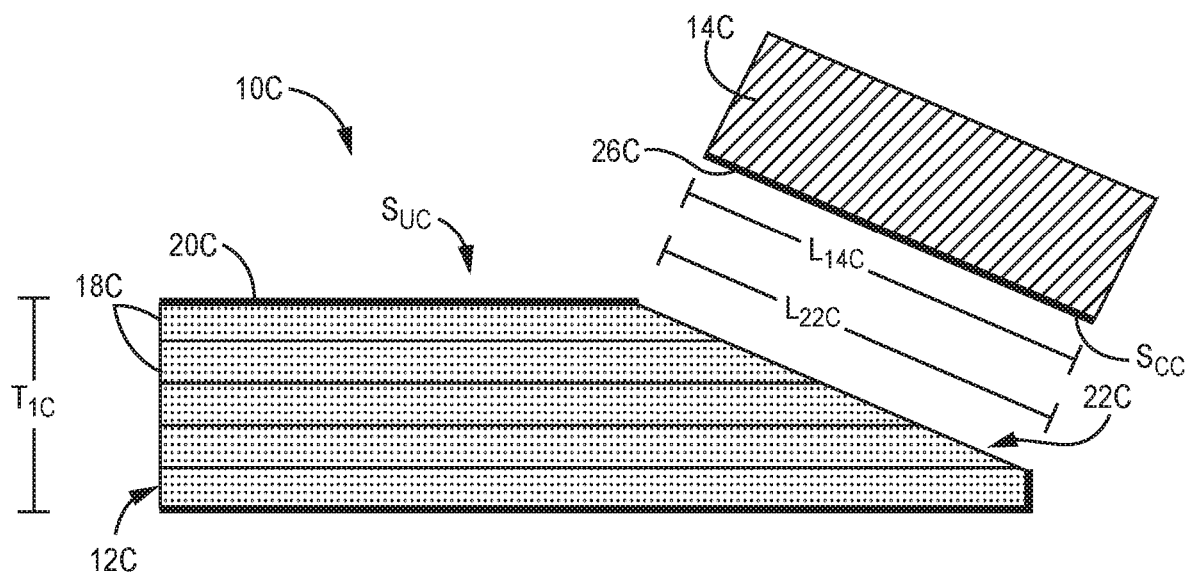
FIG. 1C is an enlarged cross-sectional view showing an abraded region of the carbon allotrope layer according to an alternative embodiment of the carbon allotrope element.

FIG. 1C is a cross-sectional view of carbon allotrope element 10C showing a portion of carbon allotrope layer 12C prior to the attachment of bus bar 14C. Carbon allotrope element 10C is similar to carbon allotrope elements 10, 10A, and 10B as described above, except for certain aspects of carbon allotrope layer 12C and abraded region 22C. In the embodiment shown in FIG. 1C, carbon allotrope layer 12C includes a plurality of stacked carbon allotrope sheets 18C. Carbon allotrope layer 12C further includes abraded region 22C that is angled away from upper surface $S_{UC}$ of carbon allotrope layer 12C. This arrangement allows for contact surface $S_{CC}$ of bus bar 14C to be in electrical communication with a portion of each sheet 18C when bus bar 14C is adhered to abraded region 22C in a similarly angled manner. Like abraded region 22B, forming abraded region 22C includes the removal of dielectric layer 20C and carbon allotrope material. Although shown as a relatively smooth slope, abraded region 22C can be formed to have an angled step profile.

Despite its layered arrangement, carbon allotrope layer 12C has a first thickness $T_{1C}$ that is substantially similar to first thicknesses $T_{1A}$ and $T_{1B}$. Because of the angled profile of abraded region 22C, carbon allotrope layer can have a variable second thickness $T_{2C}$ (not labeled in FIG. 3) depending on the point along abraded region 22C at which the thickness is measured. Second thickness $T_{2C}$ will generally be less than first $T_{1C}$ at most points.

Like the embodiments of FIGS. 1A and 1B, abraded region 22C has a length $L_{22C}$ extending in the x direction, and a width (not shown) extending in the z direction. Similarly, bus bar 14B has a length $L_{14C}$ extending in the x direction and a width (not shown) extending in the z direction. Also like the embodiment of FIG. 1B, abraded region 22C includes removed carbon allotrope material, so the area of bus bar 14C can advantageously be greater than the area of abraded region 22C. This can be accomplished by making either or both the length $L_{14C}$ and width of bus bar 14C greater than the corresponding dimensions of abraded region 22C.

FIG. 1C also shows conductive adhesive 26C applied to contact surface $S_{CC}$ of bus bar 14C. Conductive adhesive 26C can be used to ensure a strong bond between bus bar 14 and abraded region 22C. Conductive adhesive 26C can be a resin material that is comparatively more electrically conductive than dielectric layer 20C. Although shown applied to bus bar 14C, conductive adhesive 26C can additionally and/or alternatively be applied to abraded region 22C. Further, conductive adhesive can be similarly applied in any of the embodiments shown in FIGS. 1-1B.

In an exemplary embodiment, abraded regions 22A, 22B, and 22C can be formed using a laser (e.g., etching or ablation) to remove the desired amount of the dielectric layer and carbon allotrope material. More specifically, abraded regions 22A, 22B, and 22C can be formed making one or more passes over the target area with an infrared laser. The number of passes will depend on the power setting as well as the desired configuration of the abraded region. A relatively low power setting (i.e., as compared to a perforation process) can provide for finer control of the amount of material removed. In an alternative embodiment, abraded regions 22A, 22B, and 22C can be formed using sanding or grinding process with abrasive particles, or a machine grinding process. Bus bars can be attached after the formation of the abraded regions, using a conductive adhesive as desired.

The disclosed resistive elements can be arranged to increase electrical communication between the carbon allotrope layer and the bus bars. This allows for improved thermo-electrical performance of the elements. The removal methods can be tailored to provide abraded regions of various shapes and dimensions. The disclosed elements can be used for heating or sensing applications in aerospace and other transportation industries, as well as various household/consumer applications.

DISCUSSION OF POSSIBLE EMBODIMENTS

The following are non-exclusive descriptions of possible embodiments of the present invention.

A carbon allotrope element includes a carbon allotrope layer formed from a carbon allotrope material impregnated with a dielectric resin and having a first surface. The carbon allotrope element further includes a first bus bar in communication with the first surface, and a second bus bar in communication with the first surface and non-adjacent to the first bus bar. The first surface includes a layer of the dielectric resin and a plurality of abraded regions, and each of the first and second bus bars is in communication with one of the plurality of abraded regions of the first surface.

The carbon allotrope element of the preceding paragraph can optionally include, additionally and/or alternatively, any one or more of the following features, configurations and/or additional components:

In the above carbon allotrope element, the carbon allotrope layer can have a first thickness that includes the layer of the dielectric resin.

In any of the above carbon allotrope elements, the carbon allotrope layer can have a second thickness that includes one of the plurality of abraded regions, and the second thickness can be less than the first thickness.

In any of the above carbon allotrope elements, the first thickness can range from 0.0001 in (0.00254 mm) to 0.005 in (0.127 mm).

In any of the above carbon allotrope elements, the first thickness can range from 0.001 in (0.0254 mm) to 0.003 in (0.0762 mm).

In any of the above carbon allotrope elements, the second thickness can range from 50% to 95% of the first thickness.

In any of the above carbon allotrope elements, the second thickness can range from 65% to 85% of the first thickness.

In any of the above carbon allotrope elements, each of the plurality of abraded regions can include at least one resin-free section.

In any of the above carbon allotrope elements, the at least one resin-free section can include a plurality of resin-free sections.

In any of the above carbon allotrope elements, an area of the abraded region can be equal or less than to an area of a contact surface of the first bus bar.

In any of the above carbon allotrope elements, each of the plurality of abraded regions can be angled with respect to the first surface.

In any of the above carbon allotrope elements, the carbon allotrope layer can include a plurality of individual carbon allotrope sheets.

In any of the above carbon allotrope elements, the carbon allotrope material can include carbon nanotubes (CNTs), nano-carbon fibers, graphene nanoribbons (GNRs), or graphite In any of the above carbon allotrope elements, the carbon allotrope element can be a heating element or a sensing element.

A method of forming a carbon allotrope element includes removing material from a first surface of a carbon allotrope layer to form an abraded region and adhering a bus bar to the abraded region. The material removed from the first surface can include a dielectric resin layer.

The method of the preceding paragraph can optionally include, additionally and/or alternatively, any one or more of the following features, configurations and/or additional components:

In the above method, the removing step can include a process involving a laser or abrasive particles.

In any of the above methods, the bus bar can be adhered to the abraded region using a conductive adhesive.

In any of the above methods, the material removed from the first surface can further include a carbon allotrope material at least partially forming the carbon allotrope layer.

In any of the above methods, the abraded region can be angled with respect to the first surface of the carbon allotrope layer.

Any of the above methods can further include removing material to form an additional abraded region, and adhering an additional bus bar to the additional abraded region.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A carbon allotrope element comprising:
   a carbon allotrope layer comprising a carbon allotrope material impregnated with a dielectric resin, the carbon allotrope layer having a first surface;
   a first bus bar in communication with the first surface;
   a second bus bar in communication with the first surface and non-adjacent to the first bus bar;
   wherein the first surface comprises a layer of the dielectric resin and a plurality of abraded regions in the dielectric layer, each of the plurality of abraded regions comprising a resin-free section; and
   wherein each of the first and second bus bars is in communication with a resin-free section of one of the plurality of abraded regions of the first surface.

2. The carbon allotrope element of claim 1, wherein the carbon allotrope layer has a first thickness that includes the layer of the dielectric resin.

3. The carbon allotrope element of claim 2, wherein the carbon allotrope layer has a second thickness that includes one of the plurality of abraded regions, and wherein the second thickness is less than the first thickness.

4. The carbon allotrope element of claim 3, wherein the first thickness ranges from 0.0001 in (0.00254 mm) to 0.005 in (0.127 mm).

5. The carbon allotrope element of claim 3, wherein the first thickness ranges from 0.001 in (0.0254 mm) to 0.003 in (0.0762 mm).

6. The carbon allotrope element of claim 3, wherein the second thickness ranges from 50% to 95% of the first thickness.

7. The carbon allotrope element of claim 3, wherein the second thickness ranges from 65% to 85% of the first thickness.

8. The carbon allotrope element of claim 1, wherein the at least one resin-free section comprises a plurality of resin-free sections.

9. The carbon allotrope element of claim 1, wherein an area of the abraded region is equal or less than to an area of a contact surface of the first bus bar.

10. The carbon allotrope element of claim 1, wherein each of the plurality of abraded regions is angled with respect to the first surface.

11. The carbon allotrope element of claim 1, wherein the carbon allotrope layer comprises a plurality of individual carbon allotrope sheets.

12. The carbon allotrope element of claim 1, wherein the carbon allotrope material comprises carbon nanotubes (CNTs), nano-carbon fibers, graphene nanoribbons (GNRs), or graphite.

13. The carbon allotrope element of claim 1, wherein the carbon allotrope element is a heating element or a sensing element.

14. A method of forming a carbon allotrope element, the method comprising:
    removing material from a first surface of a carbon allotrope layer to form an abraded region; and
    adhering a bus bar to the abraded region;
    wherein the material removed from the first surface includes a dielectric resin layer; and
    wherein the bus bar is adhered to a resin-free section of the abraded region.

15. The method of claim 14, wherein the removing step comprises a process involving a laser or abrasive particles.

16. The method of claim 14, wherein the bus bar is adhered to the abraded region using a conductive adhesive.

17. The method of claim 14, wherein the material removed from the first surface further includes a carbon allotrope material at least partially forming the carbon allotrope layer.

18. The method of claim 14, wherein the abraded region is angled with respect to the first surface of the carbon allotrope layer.

19. The method of claim 14 and further comprising:
    removing material to form an additional abraded region; and
    adhering an additional bus bar to the additional abraded region.

* * * * *